(No Model.)
Z. S. SPALDING.
FILTRATION OF LIQUIDS.
No. 517,966. Patented Apr. 10, 1894.
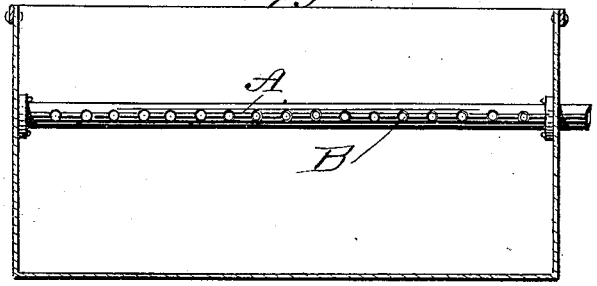
Fig. 1.
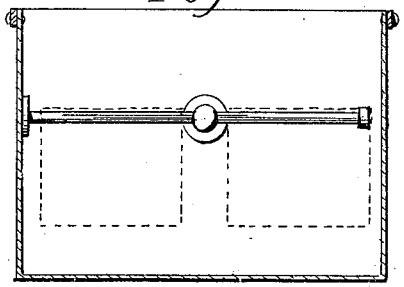
Fig. 1b.
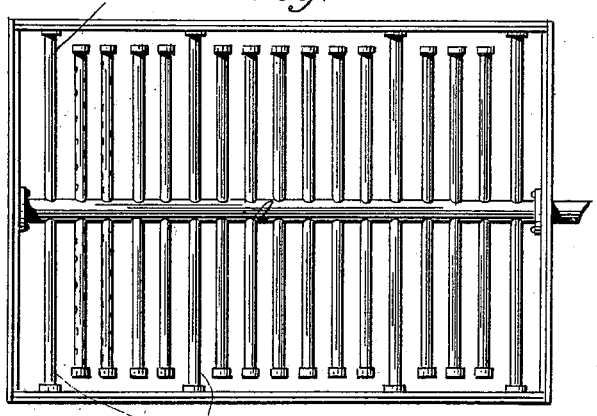
Fig. 1a.
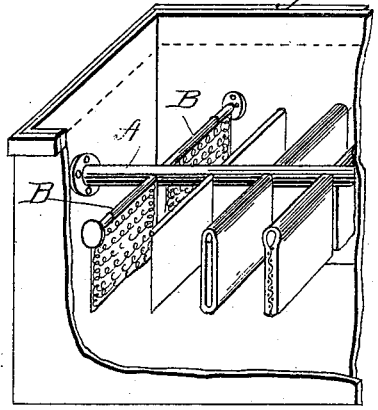
Fig. 6.
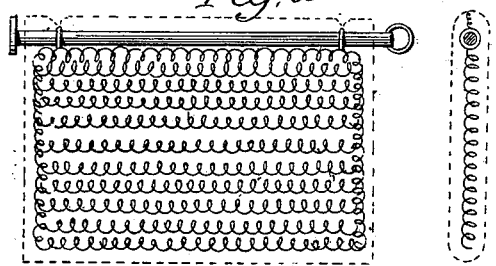
Fig. 2.
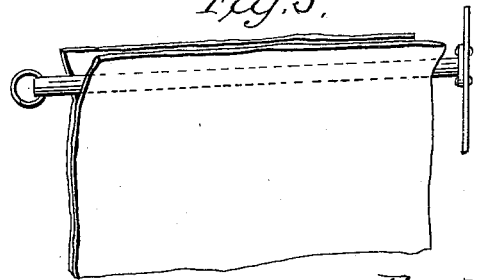
Fig. 5.
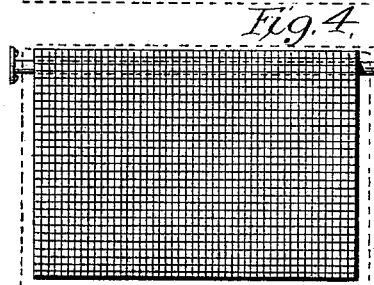
Fig. 4.
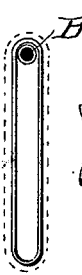
Fig. 3.
Attest
F. L. Middleton
Wm. F. Hall
Inventor
Zephaniah S. Spalding
by Ellis Spear
Atty.
THE NATIONAL LITHOGRAPHING COMPANY,
WASHINGTON, D. C.

UNITED STATES PATENT OFFICE.

ZEPHANIAH S. SPALDING, OF KEALIA, ISLAND OF KAUAI, SANDWICH ISLANDS.

FILTRATION OF LIQUIDS.

SPECIFICATION forming part of Letters Patent No. 517,966, dated April 10, 1894.

Application filed March 20, 1893. Serial No. 466,941. (No model.) Patented in Hawaii April 18, 1892.

*To all whom it may concern:*

Be it known that I, ZEPHANIAH S. SPALDING, a citizen of the Hawaiian Islands, residing at Kealia, Island of Kauai, Sandwich Islands, have invented certain new and useful Improvements in Filtration of Liquids, of which the following is a specification.

This invention has been patented to me in the Hawaiian Islands under date of April 18, 1892.

The object of the improvement is the easy and economical filtration or filtering of liquids, and especially of sugar cane juices or sirups, without undue exposure to the air.

It is well known to sugar makers that the exposure of saccharine juices or sirups to the air, (or the chemical action of the elements thereof) is highly detrimental and causes much less by inversion, &c., especially when those juices or sirups are of weak or low density. In all ordinary filters, filter-presses or strainers the custom has been and is to force the juice or sirup (so to be filtered) through the filtering medium by means of a force pump or the pressure of gravity, and allow the same to pass out through small delivery cocks, in order to show the working of each frame, bag, or other medium through which the juice or sirup may have passed. And as the said pressure or force is apt to show its effect unequally, it is not uncommon to have one or more of the said cocks show bad work on the part of the frame or bag to which it is connected (and so require to be shut off, or closed) while the others are working well and the liquid running clear. In my method or invention the pressure is so evenly distributed, and so exact upon all parts, that the frames work alike and it is unnecessary to have a system of discharge cocks to show the condition or work of individual frames. And the filtering surface is so great there is no undue strain or pressure upon any one part.

The filter may be arranged in any way to suit the convenience of the party using it, so long as the theory and principle is observed and may be of any desired size or dimensions. But for quick and economical work the dimensions shown by the annexed drawings have been found very effective.

Figure 1, represents a tank of cast or wrought iron, about seven (7) feet wide, by ten (10) feet long, by five (5) feet deep. Fig. 1$^a$ is a plan view and Fig. 1$^b$ a transverse section. Fig. 2, is a detached view of one of the filter frames. Fig. 3, is a view showing a section of the pipe A and details of the pipes B. Figs. 4 and 5, are detached views of the filter cloth bags. Fig. 6, is a perspective view of a part of the apparatus.

Through the center, from end to end, (and about three feet from the bottom) runs a four inch pipe, made fast to one end of the tank by means of a blank flange and passing through the other end by means of a stuffing gland or its equivalent. To this pipe, marked A, is connected a series of one and one-half inch pipes (simply screwed in by means of a thread) placed about five (5) inches apart, with the opposite ends closed by means of caps or fastened to the side of the tank by blank flanges. The caps are cheapest; but it is necessary to fasten a number of the pipes by means of flanges according to the size of the tank, to hold the weight of the pipes as well as to stiffen the tank itself. These pipes, marked B, are bored with small holes (as shown by Fig. 3) to admit the juice or sirup after passing through the filter bags or frames. If a steam coil is used in the tank these pipes must be so placed as to allow a space in one end of the tank for a small boy to get in and clean.

Attached to the pipes B is a series of filter frames, shown in detail by Fig. 2, and found very convenient, as follows:—A steel wire (or brass preferred) mat, woven spirally so as to make thickness but still be open and free, as found in the "Hartman" door mat, is used to keep the filter bag from closing by pressure or suction. The "Hartman" door mat is made of the convenient dimensions, thirty-six inches by twenty-two inches, and about one inch thick, with a flexible mesh or net of one-half to three-fourths square and a round or rolling border of woven or twisted wire, the whole forming a most excellent frame upon which to stretch the filter bag. A wire frame may be made of any strong wire cloth, having required openness of mesh and proper dimensions, by simply closing or sewing together the ends after folding over the one and one-half inch pipe, as aforesaid, and this (or any other device) may be used as a frame or support for the filter cloth bags (see Fig. 4.) But the Hartman door mat, referred to and described, is recommended, as it can be easily hung on the receiving pipes by means of small hooks and as easily removed for cleaning and changing of bags, while it forms a most excellent frame upon which to stretch the bag of filter cloth and allowing the juice or sirup to pass freely into the pipes (B) after percolating through the cloth or other filtering medium. If required there may be added any filtering substance, bone black, or charcoal, so long as precaution is taken to prevent the holes in the receiving pipes being stopped.

The filter bag (shown by Fig. 5) may be made of any desired quality of cloth or other substance, and is simply of size or dimensions a little larger than the mat or other frame used. It must, of course, be open at one end to slip over the mat or frame, and must be tied or sewed closely over and around the receiving pipe so that no liquid can enter the pipe save by percolating through the bag itself.

Single or double bags may be used, according to the density of the liquid to be filtered and the rapidity of work required.

Fig. 6 is a perspective view of a part of the apparatus.

The manner of working the filter is as follows:—The bags being well fitted around the frames or mats, and closely fastened over the pipes (B) the juice or sirup is allowed to fill the tank (Fig. 1) above the pipes when the same will percolate through the sides of the bags, enter the receiving pipes (B) from the under side, and passing through the main pipe (A) will be drawn off by suction pump or by gravity into the receiving vessels below, or into the evaporator direct. A valve in the outlet of pipe A will regulate the flow as desired. If a steam coil be used in the bottom of the tank the juice or sirup can be heated up to the proper degree for coagulation of the glutinous matter contained in the liquid and the filtration will be more perfect. Lime may be added to the juice or sirup, either before running into the tank or in the tank itself, and the work of defecation or clarifying be performed simultaneously with the filtration. Upon the juice or liquid being brought up to the proper degree of heat, or say a temperature of about 210° Fahrenheit, the glutine or albuminous matter will either rise to the surface in the form of a light thick scum and may be skimmed off, or it will remain in the form of coagulated specks held in suspension (being of about the same specific gravity as the juice or liquid) and in the working will either adhere to the sides of the filter bags or be precipitated to the bottom of the tank from whence it can be removed when the filter bags are renewed and the tank cleaned. To insure constant work and good results there must be, of course, more than one tank fitted with pipes, frames, bags, &c., so that one or more may be working while the others are being cleaned and having the bags renewed.

The pipes described must, of course, be kept covered by or immersed in the juice or liquid so to be filtered, and, naturally the greater the quantity of liquid thus above the pipes the greater will be the pressure upon the filtering surface and the faster the filtration may be expected to go on. If a suction pump be used for drawing off the juice or liquid, or if connection be made from the pipe A direct to the triple effect, the filtration may be expected to be more rapid; but owing to the immense filtering surface (nearly twelve square feet to each frame or bag) there will be found no necessity for either great pressure or suction. In fact the work is best accomplished when the juice or liquid to be filtered is allowed to percolate through the filter bags with as little force or pressure as possible.

The bags must be renewed and the tank cleaned as found necessary in each case. No rule can be given for this work.

What I claim is—

1. In combination with a suitable tank or receptacle, a single discharge from said tank, a central conduit within the tank communicating with said discharge, a series of lateral branch pipes extending from said main pipe, said branch pipes being perforated, filter bags surrounding said perforated pipes and metallic frames within the filter bags, substantially as described.

2. In combination with a suitable tank, a discharge pipe therein, a series of perforated pipes extending laterally therefrom upon each side, part of said pipes being extended beyond the rest and having their outer ends connected with the side walls of the tank, frames depending from said pipes and filter bags enveloping the pipes and frames substantially as described.

In testimony whereof I affix my signature in presence of two witnesses.

ZEPHANIAH S. SPALDING.

Witnesses:
ROBT. M. HOOPER,
I. CHATEL.